US008688087B2

(12) United States Patent
Pitt et al.

(10) Patent No.: US 8,688,087 B2
(45) Date of Patent: Apr. 1, 2014

(54) N-DIMENSIONAL AFFINITY CONFLUENCER

(75) Inventors: Lance D. Pitt, Kent, WA (US); Thomas Ginter, Bellevue, WA (US); Gordon John Hines, Kirkland, WA (US); Victor Burton, Bellevue, WA (US); Mark Ramberg, Bellevue, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 266 days.

(21) Appl. No.: 13/064,796

(22) Filed: Apr. 15, 2011

(65) Prior Publication Data

US 2012/0157136 A1 Jun. 21, 2012

Related U.S. Application Data

(60) Provisional application No. 61/457,061, filed on Dec. 17, 2010, provisional application No. 61/457,145, filed on Jan. 14, 2011.

(51) Int. Cl.
*H04M 3/42* (2006.01)
(52) U.S. Cl.
USPC ........................................ 455/414.2; 455/418
(58) Field of Classification Search
USPC .............. 455/404.2, 414.2, 440, 456.1, 456.2
See application file for complete search history.

(56) References Cited

U.S. PATENT DOCUMENTS

| 1,103,073 | A | 7/1914 | O'Connell |
|---|---|---|---|
| 4,445,118 | A | 4/1984 | Taylor |
| 4,494,119 | A | 1/1985 | Wimbush |
| 4,651,156 | A | 3/1987 | Martinez |
| 4,706,275 | A | 11/1987 | Kamil |
| 4,868,570 | A | 9/1989 | Davis |
| 4,891,638 | A | 1/1990 | Davis |
| 4,891,650 | A | 1/1990 | Sheffer |

(Continued)

FOREIGN PATENT DOCUMENTS

KR WO/2006/075856 7/2006
WO PCT/SE98/01887 10/1998

(Continued)

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

(Continued)

*Primary Examiner* — Tu X Nguyen
(74) *Attorney, Agent, or Firm* — William H. Bollman

(57) ABSTRACT

An N-dimensional affinity confluencer comprises an affinity table to maintain a plurality of affinities for each of a plurality of wireless devices. A sphere of influence (SPIN) table provides an influence for determination of a confluence between affinities maintained in the affinity table. An affinity confluence determination module determines an affinity confluence between the plurality of wireless devices and an influence parameter associated with the sphere of influence (SPIN) table. An affinity confluence is determined from among a plurality of wireless devices by determining a confluence of at least two predefined affinities from among a plurality of wireless devices. A sphere of influence parameter is applied to the confluence to determine those of the plurality of wireless devices defined by an affinity confluence. The plurality of wireless devices need not be within a common communication network.

10 Claims, 8 Drawing Sheets

(56) References Cited

U.S. PATENT DOCUMENTS

| | | |
|---|---|---|
| 4,910,767 A | 3/1990 | Brugliera et al. |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,611,050 A | 3/1997 | Theimer |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,930,250 A | 7/1999 | Klok |
| 5,930,701 A | 7/1999 | Skog |
| 5,943,399 A | 8/1999 | Banister |
| 5,945,944 A | 8/1999 | Krasner |
| 5,946,629 A | 8/1999 | Sawyer |
| 5,946,630 A | 8/1999 | Willars |
| 5,950,130 A | 9/1999 | Coursey |
| 5,950,137 A | 9/1999 | Kim |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithol |

(56) References Cited

U.S. PATENT DOCUMENTS

| | | |
|---|---|---|
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabash |
| 6,104,931 A | 8/2000 | Havinis |
| 6,108,533 A | 8/2000 | Brohoff |
| 6,121,923 A | 9/2000 | King |
| 6,122,503 A | 9/2000 | Daly |
| 6,122,520 A | 9/2000 | Want |
| 6,124,810 A | 9/2000 | Segal |
| 6,131,028 A | 10/2000 | Whittington |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schnieder |
| 6,178,506 B1 | 1/2001 | Quick, Jr. |
| 6,181,935 B1 | 1/2001 | Gossman |
| 6,181,939 B1 | 1/2001 | Ahvenainen |
| 6,188,354 B1 | 2/2001 | Soliman |
| 6,188,752 B1 | 2/2001 | Lesley |
| 6,188,909 B1 | 2/2001 | Alanara |
| 6,189,098 B1 | 2/2001 | Kaliski, Jr. |
| 6,195,555 B1 | 2/2001 | Dent |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Windbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotala |
| 6,324,524 B1 | 11/2001 | Lent |
| 6,327,473 B1 | 12/2001 | Soliman |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,397,074 B1 | 5/2002 | Pihl |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchinson, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko |
| 6,556,832 B1 | 4/2003 | Soliman |
| 6,560,456 B1 | 5/2003 | Lohtia |
| 6,560,461 B1 | 5/2003 | Fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |

(56) References Cited

U.S. PATENT DOCUMENTS

| | | |
|---|---|---|
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockheart |
| 6,680,695 B2 | 1/2004 | Turetzky |
| 6,687,504 B1 | 2/2004 | Raith |
| 6,690,940 B1 | 2/2004 | Brown |
| 6,691,019 B2 | 2/2004 | Seeley |
| 6,694,258 B2 | 2/2004 | Johnson |
| 6,694,351 B1 | 2/2004 | Shaffer |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,757,545 B2 | 6/2004 | Nowak |
| 6,771,742 B2 | 8/2004 | McCalmont et al. |
| 6,771,971 B2 | 8/2004 | Smith |
| 6,772,340 B1 | 8/2004 | Peinado |
| 6,775,255 B1 | 8/2004 | Roy |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,264 B2 | 11/2004 | Vassilovski |
| 6,813,499 B2 | 11/2004 | McDonnell |
| 6,813,501 B2 | 11/2004 | Kinnunen |
| 6,813,560 B2 | 11/2004 | Van Diggelen |
| 6,816,111 B2 | 11/2004 | Krasner |
| 6,816,580 B2 | 11/2004 | Timmins |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Baucke et al. |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,865,538 B2 | 3/2005 | Chithambaram |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,898,633 B2 | 5/2005 | Lyndersay |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Pitt |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rosseau |
| 7,110,773 B1 | 9/2006 | Wallace |
| 7,123,874 B1 | 10/2006 | Brennan |
| 7,136,466 B1 | 11/2006 | Gao |
| 7,136,838 B1 | 11/2006 | Peinado |
| 7,151,946 B2 | 12/2006 | Maggenti |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,200,380 B2 | 4/2007 | Havlark |
| 7,209,758 B1 | 4/2007 | Moll et al. |
| 7,209,969 B2 | 4/2007 | Lahti |
| 7,218,940 B2 | 5/2007 | Niemenna |
| 7,221,959 B2 | 5/2007 | Lindquist |

(56) References Cited

U.S. PATENT DOCUMENTS

| | | |
|---|---|---|
| 7,245,900 B1 | 7/2007 | Lamb |
| 7,246,187 B1 | 7/2007 | Ezra |
| 7,260,186 B2 | 8/2007 | Zhu |
| 7,260,384 B2 | 8/2007 | Bales et al. |
| 7,269,428 B1 | 9/2007 | Wallenius |
| 7,302,582 B2 | 11/2007 | Snapp |
| 7,321,773 B2 | 1/2008 | Hines |
| 7,330,899 B2 | 2/2008 | Wong |
| 7,333,480 B1 | 2/2008 | Clarke |
| 7,369,508 B2 | 5/2008 | Parantainen |
| 7,369,530 B2 | 5/2008 | Keagy |
| 7,382,773 B2 | 6/2008 | Schoeneberger |
| 7,392,240 B2 | 6/2008 | Scriffignano |
| 7,394,896 B2 | 7/2008 | Norton |
| 7,428,571 B2 | 9/2008 | Ichimura |
| 7,436,785 B1 | 10/2008 | McMullen |
| 7,440,442 B2 | 10/2008 | Grabelsky et al. |
| 7,444,342 B1 | 10/2008 | Hall |
| 7,450,951 B2 | 11/2008 | Vimpari |
| 7,471,236 B1 | 12/2008 | Pitt |
| 7,573,982 B2 | 8/2009 | Breen |
| 7,602,886 B1 | 10/2009 | Beech |
| 7,623,447 B1 | 11/2009 | Faccin |
| 7,711,094 B1 | 5/2010 | Olshansky |
| 7,764,961 B2 | 7/2010 | Zhu |
| 7,783,297 B2 | 8/2010 | Ishii |
| 7,787,611 B1 | 8/2010 | Kotelly |
| 7,792,989 B2 | 9/2010 | Toebes |
| 7,825,780 B2 | 11/2010 | Pitt |
| 7,881,233 B2 | 2/2011 | Bieselin |
| 7,937,067 B2 | 5/2011 | Maier |
| 8,005,683 B2 | 8/2011 | Tessesl |
| 8,027,658 B2 | 9/2011 | Suryanarayana |
| 8,060,389 B2 | 11/2011 | Johnson |
| 8,200,291 B2 | 6/2012 | Steinmetz |
| 8,308,570 B2 | 11/2012 | Fiedler |
| 2001/0011247 A1 | 8/2001 | O'Flaherty |
| 2001/0040886 A1 | 11/2001 | Jimenez |
| 2001/0049274 A1 | 12/2001 | Degraeve |
| 2002/0002036 A1 | 1/2002 | Uehara |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069079 A1 | 6/2002 | Vega |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086676 A1 | 7/2002 | Hendry |
| 2002/0098832 A1 | 7/2002 | Fleischer |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0123354 A1 | 9/2002 | Nowak |
| 2002/0126656 A1 | 9/2002 | Park |
| 2002/0138650 A1 | 9/2002 | Yamamoto |
| 2002/0147023 A1 | 10/2002 | Sawada |
| 2002/0156732 A1 | 10/2002 | Odijk |
| 2002/0158777 A1 | 10/2002 | Flick |
| 2002/0164998 A1 | 11/2002 | Younis |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0044654 A1 | 3/2003 | Holt |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086422 A1 | 5/2003 | Klinker et al. |
| 2003/0086539 A1 | 5/2003 | McCalmont |
| 2003/0100320 A1 | 5/2003 | Ranjan |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0118160 A1 | 6/2003 | Holt |
| 2003/0119521 A1 | 6/2003 | Tipnis |
| 2003/0119528 A1 | 6/2003 | Pew |
| 2003/0125042 A1 | 7/2003 | Olrik |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0169881 A1 | 9/2003 | Niedermeyer |
| 2003/0186709 A1 | 10/2003 | Rhodes |
| 2003/0196105 A1 | 10/2003 | Fineberg |
| 2003/0204640 A1 | 10/2003 | Sahineja |
| 2003/0223381 A1 | 12/2003 | Schroderus |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman |
| 2004/0068724 A1 | 4/2004 | Gardner |
| 2004/0070515 A1 | 4/2004 | Burkley |
| 2004/0077359 A1 | 4/2004 | Bernas |
| 2004/0078694 A1 | 4/2004 | Lester |
| 2004/0092250 A1 | 5/2004 | Valloppillil |
| 2004/0098497 A1 | 5/2004 | Banet |
| 2004/0132465 A1 | 7/2004 | Mattila |
| 2004/0143852 A1 | 7/2004 | Meyers |
| 2004/0181689 A1 | 9/2004 | Kiyoto |
| 2004/0184584 A1 | 9/2004 | McCalmont |
| 2004/0185875 A1 | 9/2004 | Diacakis |
| 2004/0190497 A1 | 9/2004 | Knox |
| 2004/0198332 A1 | 10/2004 | Lundsgaard |
| 2004/0198386 A1 | 10/2004 | Dupray |
| 2004/0203876 A1 | 10/2004 | Drawert |
| 2004/0203922 A1 | 10/2004 | Hines |
| 2004/0205151 A1 | 10/2004 | Sprigg |
| 2004/0209594 A1 | 10/2004 | Naboulsi |
| 2004/0225878 A1 | 11/2004 | Costa-Requena |
| 2004/0229632 A1 | 11/2004 | Flynn |
| 2004/0235493 A1 | 11/2004 | Ekerborn |
| 2004/0242238 A1 | 12/2004 | Wang |
| 2004/0267445 A1 | 12/2004 | De Luca |
| 2005/0020242 A1 | 1/2005 | Holland |
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Loppe |
| 2005/0053209 A1 | 3/2005 | D'Evelyn |
| 2005/0071251 A1 | 3/2005 | Linden |
| 2005/0071671 A1 | 3/2005 | Karaoguz |
| 2005/0074107 A1 | 4/2005 | Renner |
| 2005/0083891 A1 | 4/2005 | Chuang |
| 2005/0083911 A1 | 4/2005 | Grabelsky |
| 2005/0086467 A1 | 4/2005 | Asokan |
| 2005/0090236 A1 | 4/2005 | Schwinke |
| 2005/0107673 A1 | 5/2005 | Ball |
| 2005/0112030 A1 | 5/2005 | Gaus |
| 2005/0119012 A1 | 6/2005 | Merheb |
| 2005/0134504 A1 | 6/2005 | Harwood |
| 2005/0135569 A1 | 6/2005 | Dickinson et al. |
| 2005/0136885 A1 | 6/2005 | Kaltsukis |
| 2005/0148346 A1 | 7/2005 | Maloney |
| 2005/0149430 A1 | 7/2005 | Williams |
| 2005/0169248 A1 | 8/2005 | Truesdale |

(56) References Cited

U.S. PATENT DOCUMENTS

| | | |
|---|---|---|
| 2005/0174991 A1 | 8/2005 | Keagy |
| 2005/0192822 A1 | 9/2005 | Hartenstein |
| 2005/0201529 A1 | 9/2005 | Nelson |
| 2005/0209995 A1 | 9/2005 | Aksu |
| 2005/0213716 A1 | 9/2005 | Zhu |
| 2005/0216300 A1 | 9/2005 | Appelman |
| 2005/0232252 A1 | 10/2005 | Hoover |
| 2005/0238156 A1 | 10/2005 | Turner |
| 2005/0239458 A1 | 10/2005 | Hurtta |
| 2005/0250516 A1 | 11/2005 | Shim |
| 2005/0259675 A1 | 11/2005 | Tuohino |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0010200 A1 | 1/2006 | Mousseau |
| 2006/0023747 A1 | 2/2006 | Koren et al. |
| 2006/0026288 A1 | 2/2006 | Acharya |
| 2006/0036680 A1 | 2/2006 | Shim |
| 2006/0053225 A1 | 3/2006 | Poikselka |
| 2006/0058042 A1 | 3/2006 | Shim |
| 2006/0058045 A1 | 3/2006 | Nilsen |
| 2006/0058102 A1 | 3/2006 | Nguyen et al. |
| 2006/0068753 A1 | 3/2006 | Karpen |
| 2006/0079249 A1 | 4/2006 | Shim |
| 2006/0079330 A1 | 4/2006 | Dvorak |
| 2006/0104306 A1 | 5/2006 | Adamczkk |
| 2006/0106774 A1 | 5/2006 | Cohen |
| 2006/0120517 A1 | 6/2006 | Moon |
| 2006/0128395 A1 | 6/2006 | Muhonen |
| 2006/0135177 A1 | 6/2006 | Winterbottom |
| 2006/0154710 A1 | 7/2006 | Serafat |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0225090 A1 | 10/2006 | Shim et al. |
| 2006/0234639 A1 | 10/2006 | Kushwaha |
| 2006/0234698 A1 | 10/2006 | Fok |
| 2006/0239205 A1 | 10/2006 | Warren |
| 2006/0258380 A1 | 11/2006 | Liebowitz |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffmann |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0037585 A1 | 2/2007 | Shim |
| 2007/0041513 A1 | 2/2007 | Gende |
| 2007/0041516 A1 | 2/2007 | Dickinson |
| 2007/0049288 A1 | 3/2007 | Lamprecht |
| 2007/0060097 A1 | 3/2007 | Edge |
| 2007/0072553 A1 | 3/2007 | Barbera |
| 2007/0072624 A1 | 3/2007 | Niemaenmaa |
| 2007/0081635 A1 | 4/2007 | Croak |
| 2007/0082681 A1 | 4/2007 | Kim |
| 2007/0082682 A1 | 4/2007 | Kim |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0161382 A1* | 7/2007 | Melinger et al. ........... 455/456.1 |
| 2007/0162228 A1 | 7/2007 | Mitchell |
| 2007/0167177 A1 | 7/2007 | Kraufvelin |
| 2007/0182547 A1 | 8/2007 | Wachter |
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0243885 A1 | 10/2007 | Shim |
| 2007/0263610 A1 | 11/2007 | Mitchell |
| 2007/0270164 A1 | 11/2007 | Maier |
| 2008/0032703 A1 | 2/2008 | Krumm |
| 2008/0037715 A1 | 2/2008 | Prozeniuk |
| 2008/0059304 A1 | 3/2008 | Kimsey |
| 2008/0063153 A1 | 3/2008 | Krivorot |
| 2008/0065775 A1 | 3/2008 | Polk |
| 2008/0080691 A1 | 4/2008 | Dolan |
| 2008/0109650 A1 | 5/2008 | Shim |
| 2008/0117859 A1 | 5/2008 | Shahidi |
| 2008/0146343 A1 | 6/2008 | Sullivan |
| 2008/0186164 A1 | 8/2008 | Emigh |
| 2008/0208671 A1 | 8/2008 | Ehrlich |
| 2008/0214202 A1 | 9/2008 | Toomey |
| 2008/0235511 A1 | 9/2008 | O'Brien |
| 2008/0268769 A1 | 10/2008 | Brown |
| 2008/0313000 A1 | 12/2008 | Degeratu |
| 2009/0005076 A1* | 1/2009 | Forstall et al. ............. 455/456.2 |
| 2009/0020447 A1 | 1/2009 | Potterfield et al. |
| 2009/0029675 A1 | 1/2009 | Steinmetz |
| 2009/0198733 A1 | 8/2009 | Gounares |
| 2009/0204600 A1 | 8/2009 | Kalik |
| 2009/0215466 A1 | 8/2009 | Ahl |
| 2009/0224931 A1 | 9/2009 | Dietz |
| 2009/0298488 A1 | 12/2009 | Snapp |
| 2009/0323636 A1 | 12/2009 | Dillon |
| 2010/0010860 A1 | 1/2010 | Bose |
| 2010/0021013 A1 | 1/2010 | Gale |
| 2010/0029244 A1 | 2/2010 | Moodbidri |
| 2010/0062788 A1 | 3/2010 | Nagorniak |
| 2010/0069034 A1 | 3/2010 | Dickinson |
| 2010/0125892 A1 | 5/2010 | Tanizawa |
| 2010/0167691 A1 | 7/2010 | Howarter |
| 2010/0178973 A1 | 7/2010 | Snoddy |
| 2010/0218664 A1 | 9/2010 | Toledano |
| 2011/0109468 A1 | 5/2011 | Hirschfeld |
| 2011/0113060 A1 | 5/2011 | Martini |
| 2011/0131414 A1 | 6/2011 | Cheng |
| 2011/0137549 A1 | 6/2011 | Gupta |
| 2011/0151837 A1 | 6/2011 | Winbush |
| 2011/0165861 A1 | 7/2011 | Wilson |
| 2011/0273568 A1 | 11/2011 | Lagassey |
| 2012/0001750 A1 | 1/2012 | Monroe |
| 2012/0189107 A1 | 7/2012 | Dickinson |
| 2013/0072308 A1 | 3/2013 | Peck |
| 2013/0079152 A1 | 3/2013 | Hall |

FOREIGN PATENT DOCUMENTS

| | | |
|---|---|---|
| WO | PCTUS9928848 | 12/1999 |
| WO | WO01/45342 | 6/2001 |
| WO | PCTUS0146666 | 11/2001 |
| WO | WO2004/025941 | 3/2004 |
| WO | PCT/US05/022090 | 6/2005 |
| WO | WO2005/051033 | 6/2005 |
| WO | WO 2009/105603 | 8/2009 |

OTHER PUBLICATIONS

International Search Report in PCT/US2007/23243 dated Apr. 2, 2008.

PCT International Search Report (PCTUS2007/23714) and Written Opinion of International Searching Authority, Apr. 18, 2008.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

Location Based Services V2 Roaming Support (non proprietary), 80-V8470-2NP A, dated Jan. 27, 2005, pp. 1-56.

Yilin Ahao, Efficient and reliable date transmission for cellular and GPS based mayday systems, Nov. 1997, IEEE, IEEE Conference on Intelligent Transportation System, 1997. ITSC 97, 555-559.

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

(56) References Cited

OTHER PUBLICATIONS

Alfredo Aguirre, Ilusacell, First and Only Carrier in Mexico with a 3G CDMA Network, 2007.
Mike McMullen, Sprint, LBS Roaming Summit, Sep. 19, 2006.
Andrew Yeow, BCE, LBS Roaming Summit, Sep. 19, 2006, pp. 1-8.
Nars Haran, U.S. Cellular, Packet Data—Roaming and LBS Overview, Nov. 2, 2007, pp. 1-15.
Qualcomm CDMA Technologies, LBS Control Plane Roaming—80-VD377-1NP A, 2006, pp. 1-10.
Qualcomm CDMA Technologies, MS Resident User Plane LBS Roaming—80-VC718-1 E, 2006, pp. 1-37.
PCT International Search Report in PCT.US2007/23243 dated Apr. 2, 2008.
PCT International Search Report in PCT.US2007/23714 dated Apr. 18, 2008.
International Search Report Received in PCT/US11/01971 dated Feb. 28, 2013.
International Search Report Received in PCT/US12/067932 dated Feb. 6, 2013.
International Search Report received in PCT/US2012/00208 dated Jul. 6, 2012.
International Search Report received in PCT/US2012/00266 dated Aug. 3, 3012.
Intrado MSAG Prep for E911 Program and Documentation. Intrado Inc., Longmont, CO. Sep. 14, 2006. Accessed: Nov. 8, 2011. Idaho PSAP Standards Committee. Idaho Emergency Communications Commission,http://idahodispatch.com/index.php?option=com_documan&task=doc_download&gid=3&Itemid=7.
International Preliminary Report on Patentability received in PCT/US2011/01990 dated Dec. 13, 2012.
International Search Report received in PCT/US2012/000422 dated Dec. 10, 2012.

\* cited by examiner

FIG. 5

| SPIN ID (Primary Key) | Lat | Lon | Primary X | Primary Y | Primary Z | Precord_Ptr | Secondary X | Secondary Y | Secondary Z | Srecord_Ptr | Tertiary X | Tertiary Y | Tertiary Z | Tercord_Ptr | Quaternary X | Quaternary Y | Quaternary Z | Qrecord_Ptr | Time Tag |
|---|---|---|---|---|---|---|---|---|---|---|---|---|---|---|---|---|---|---|---|
| | | | | | | | | | | | | | | | | | | | |
| | | | | | | | | | | | | | | | | | | | |
| | | | | | | | | | | | | | | | | | | | |
| | | | | | | | | | | | | | | | | | | | |

LOC Table

Network & Server Architecture

N-DIMENSIONAL AFFINITY CONFLUENCER

This application claims priority from U.S. Provisional Appl. No. 61/457,061 to PITT et al., entitled "N-Dimensional Affinity Confluencer," filed Dec. 17, 2010; and from U.S. Provisional Appl. No. 61/457,145 to PITT et al., entitled "N-Dimensional Affinity Confluencer," filed Jan. 14, 2011, the entirety of both of which are explicitly incorporated herein by reference.

BACKGROUND OF THE INVENTION

1. Field of the Invention

This invention relates generally to telecommunications. More particularly, it relates to wireless based technologies.

2. Background of the Related Art

People perceive the universe as existence within the three (3) dimensions of space and the fourth ($4^{th}$) dimension of time and they generally think of themselves as "passing through" these dimensions. In other words, people generally think of space as fixed or static and think of themselves as traveling through space from one point to another. People generally think of themselves as traveling forward through time where any particular moment is simply "now" and that "now" then immediately becomes part of "the past".

SUMMARY OF THE INVENTION

In accordance with the principles of the present invention, an N-dimensional affinity confluencer comprises an affinity table to maintain a plurality of affinities for each of a plurality of wireless devices. A sphere of influence (SPIN) table provides an influence for determination of a confluence between affinities maintained in the affinity table. An affinity confluence determination module determines an affinity confluence between the plurality of wireless devices and an influence parameter associated with the sphere of influence (SPIN) table.

In accordance with a method of determining an affinity confluence from among a plurality of wireless devices in accordance with another embodiment of the invention comprises determining a confluence of at least two predefined affinities from among a plurality of wireless devices. A sphere of influence parameter is applied to the confluence to determine those of the plurality of wireless devices defined by an affinity confluence. The plurality of wireless devices need not be within a common communication network.

BRIEF DESCRIPTION OF THE DRAWINGS

Features and advantages of the present invention become apparent to those skilled in the art from the following description with reference to the drawings:

FIG. 5 shows an exemplary location (LOC) table, in accordance with the principles of the present invention.

DETAILED DESCRIPTION OF ILLUSTRATIVE EMBODIMENTS

Figure 1:
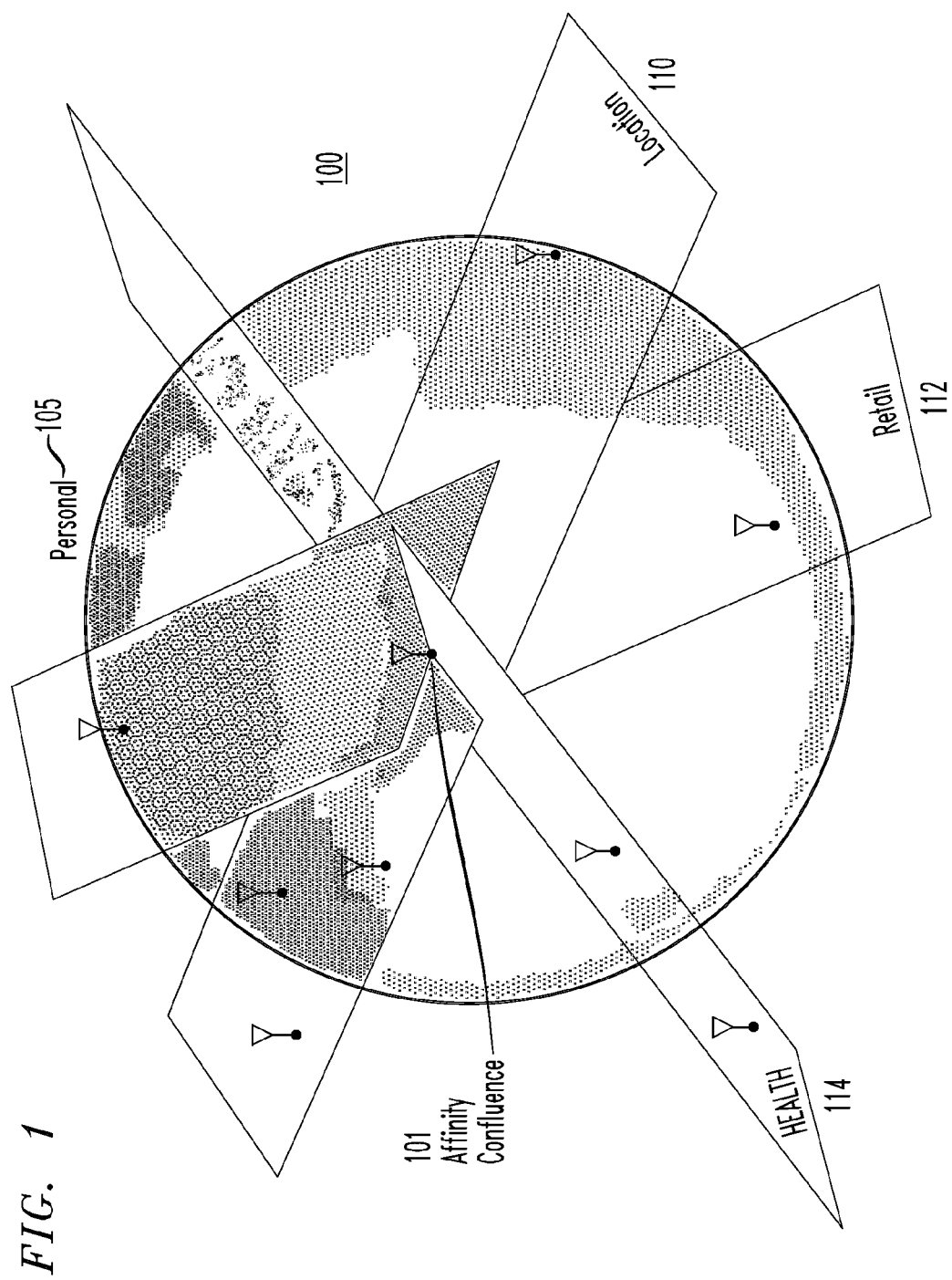
FIG. 1 depicts the function of an exemplary N-dimensional affinity confluencer, in accordance with the principles of the present invention.

FIG. 1 depicts the function of an exemplary N-dimensional affinity confluencer, in accordance with the principles of the present invention.

In particular, as depicted in FIG. 1, the present invention inverts the relationship of a wireless device within space-time and instead depicts a human being's wireless device as a "personal sphere of influence" 105 (Hereafter referred to as a SPhere of INfluence or "SPIN") transected by a virtually infinite number of "planes of interaction". This allows the perception of potential interactions between not just the physically concrete elements of day to day life but also the many digital (i.e. virtual) elements of modern life which have little if any physically concrete representation.

A simple embodiment of an N-dimensional affinity confluencer 100 in accordance with the principles of the present invention implements several dimensions of affinity, e.g., a plurality of wireless device users' respective locations 110, a plurality of user's interest in health and fitness 114, and retailers' offerings 112. The combination of these three (3) exemplary "planes of interaction" define a specific affinity confluence 101 for a given wireless device where the location of the user of that wireless device, and their interest in health and fitness, creates an opportunity for influence.

The opportunity for influence may be a projection of influence. For example, a broadcast of a wireless device user's interest in health & fitness, in combination with the user's location, may elicit an action on the part of a member of a third dimension of affinity, in this case a retailer.

Alternatively, or additionally, the opportunity for influence may be a reception of influence; if, for example, the person had joined a health & fitness social group (opt-in) affiliated with a particular natural foods and supplements retailer, then the intersection with a fourth dimension—location—of the plurality of users provide a proximity of a wireless device user to a given retailer's outlet store (i.e., a confluence of an intersection of affinity planes of a given user with the retail affinity plane 112) might elicit some form of message from the retailer to the user of the wireless device at the affinity confluence 101 identified by the affinity confluencer 100. The proximity is preferably configurable and defined by a region in the location plane.

Note that in this description of the invention use of the word "network" is purposely avoided as the word "network" has been so overloaded and over-used that resulting undesired connotations are inevitable. Each affinity plane does not necessarily define a group of wireless devices that necessarily are in communication with one another. Rather, the affinity planes are defined by configurable parameters of wireless devices, mostly configured by the respective users, and thus each affinity plane of interaction/interest may be and likely are constantly changing.

For illustrative purposes, the present invention represents each affinity plane as flat and skewed in any of a number of different directions, but the fact of the matter is that affinity planes of interaction/interest are constantly in a state of flux, constantly rippling and vibrating with changes caused by other wireless device users and/or other spheres of influence. It's the very dynamism of plane of interaction and the transitory nature of affinity confluences, and the determination of the same by the N-dimensional affinity confluencer 100, that are a principal focus of the present invention. The N-dimensional affinity confluencer 100 automatically resolves and acts upon these highly transitory affinity confluences.

The N-dimensional affinity confluencer 100 may be implemented in an appropriate server and established at an appropriate location on a carrier or provider's wireless network.

Figure 2:
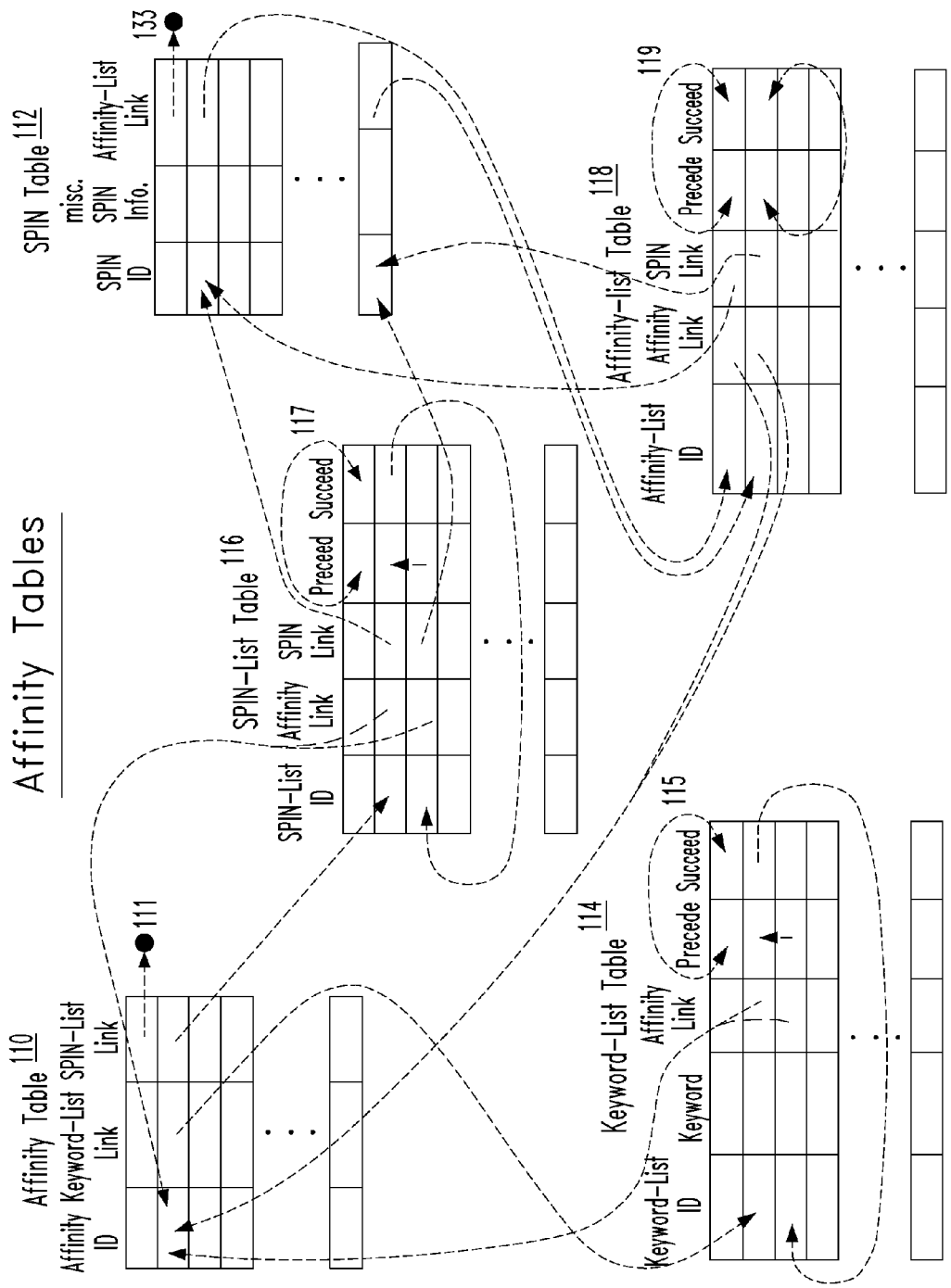
FIG. 2 depicts five (5) exemplary data structures established within the N-dimensional affinity confluencer (in this example a 5-dimensional affinity confluencer), to manage affinities, SPINs, and the identification of relationships therebetween.

FIG. 2 depicts five (5) exemplary data structures established within the N-dimensional affinity confluencer 100 (in this example a 5-dimensional affinity confluencer), to manage affinities, SPINs, and the identification of relationships therebetween.

In particular, as shown in FIG. 2, one (1) active plane of affinity is uniquely identified by two (2) keywords and two (2) active SPINs.

In the given example, all affinities are maintained using two (2) specific data structures: an Affinity Table 110, and a Keyword-List Table 114.

All participating SPINs are maintained using one (1) primary data structure: a SPIN Table 112.

The relationship between affinities and SPINs is managed using, e.g., two (2) additional data structures: a SPIN-List Table 116, and an Affinity-List Table 118.

Each record or row in the Affinity Table 110 includes (but is not limited to) an "Affinity ID" as the primary key, a "Keyword-List Link", and a "SPIN-List Link". In the given example every defined Affinity must have at least one Keyword-List entry (i.e. at least one keyword) with which to uniquely identify the Affinity; Keyword-List Link fields are preferably not allowed to be set to a TERMINATOR value. Affinities that are defined but have zero (0) associated SPINs must set the Affinity's SPIN-List Link to a TERMINATOR value 111.

Note that in this description the word "Link" is used to denote any reference/dereference mechanism used to access information from a data structure other than the data structure in which the Link resides.

Each record or row in the Keyword-List Table 114 includes (but is not limited to) a "Keyword-List ID" used as the primary key, a "Keyword", an "Affinity Link", and two (2) Keyword-List Link values called "Precede" and "Succeed" which are used to create a doubly-linked list of the keywords used to uniquely identify the Affinity. The Keyword field of a Keyword-List entry may be set to any representation of a keyword except the null or empty set. The Affinity Link field of a Keyword-List entry must refer back to one and only one associated Affinity Table entry; the Affinity Link fields are not allowed to be set to a TERMINATOR value. The PRECEDE and SUCCEED fields of a Keyword-List entry are also not allowed to be set to a TERMINATOR value. The PRECEDE and SUCCEED fields must always refer to an entry in the Keyword-List Table. Keyword-Lists that are comprised of one and only one (1) keyword will set the values of both PRECEDE and SUCCEED to refer to that one Keyword-List entry; PRECEDE and SUCCEED will refer to or point to each other 115.

Every participating SPhere of INfluence (SPIN) is represented by one (1) and only one entry in the SPIN Table 112. Each record or row in the SPIN Table 112 includes (but is not limited to) a SPIN ID used as the primary key, miscellaneous SPIN information that may be a multitude of sub-fields some of which may actually refer to other data structures or other data sources entirely, and an Affinity-List Link. Participating SPINs for which zero (0) affinities have been identified must set the SPIN's Affinity-List Link to a TERMINATOR value 113.

Relationship or association between Affinities and SPINs is managed with the SPIN-List Table 116 and the Affinity-List Table 118. The SPIN-List Table is 116 intended to allow someone to start with one (1) entry in the Affinity Table and find all SPINs associated with that Affinity. The Affinity-List Table is intended to allow someone to start with one (1) entry in the SPIN table and find all Affinities with which the SPIN is associated.

Each record or row in the SPIN-List Table 116 includes (but is not limited to) a SPIN-List ID used as the primary key, an Affinity Link, a SPIN Link, and two (2) SPIN-List link values used to create a doubly-linked list of the SPINs associated with the Affinity. The Affinity Link and SPIN Link fields are not allowed to be set to a TERMINATOR value; entries in the SPIN-List Table are only created when a relationship between an Affinity and a SPIN is created so there will always be both a reference to an Affinity as well as a reference to a SPIN. PRECEDE and SUCCEED fields must always refer to an entry in the SPIN-List Table. SPIN-Lists that are comprised of one and only one (1) SPIN set the values of both PRECEDE and SUCCEED to refer to that one SPIN-List entry; PRECEDE and SUCCEED refer to or point to each other 117.

Each record or row in the Affinity-List Table 118 includes (but is not limited to) an Affinity-List ID used as the primary key, an Affinity Link, a SPIN Link, and two (2) Affinity-List link values used to create a doubly-linked list of the Affinities with which the SPIN is associated. The Affinity Link and SPIN Link fields are not allowed to be set to a TERMINATOR value; entries in the Affinity-List Table are only created when a relationship between an Affinity and a SPIN is created so there is always both a reference to an Affinity as well as a reference to a SPIN. PRECEDE and SUCCEED fields must always refer to an entry in the Affinity-List Table. Affinity-Lists that are comprised of one and only one (1) Affinity set the values of both PRECEDE and SUCCEED to refer to that one Affinity-List entry; PRECEDE and SUCCEED refer to or point to each other 119.

Persons adept in the art of data management will readily understand that there are many, many interesting ways of accessing and using information contained in the five (5) structures defined above. The tenets of this invention are not intended to encompass only the uses described above but rather any mechanism, methodology, or use which enterprising persons find for the data contained therein.

As another embodiment of this invention, location forms the lynchpin for defining N-Dimensional Affinity Confluences. In this case the principal plane of interaction transecting the sphere of influence is location. Use of location as the primary vector of every Affinity Confluence juxtaposes the exertion of influence (i.e. projection and reception) versus "Attraction" and "Repulsion" inducements to fully parameterize the bounds of the invention.

For the purposes of this invention, influence will be defined from the standpoint of a wireless device user's SPhere of INfluence (SPIN). Projection of influence specifically means that the wireless device's location and other pre-defined affinities configured by its user cause an unplanned action by someone or something else such that the action is directed at the wireless device. The wireless device's location+affinities+projected influence cause an instantaneous and unplanned action. The projection of influence can also be represented as "unprofiled" or "analytic" in the sense that it was not the result of settings or parameters of a personal profile defined by the person prior to the time of the action but rather the result of analysis of a gamut of various data that results in the instantaneous realization of influence. Reception of influence specifically means that the wireless device's location and pre-defined affinities cause an action planned by someone or something else such that the action is directed at the wireless device (i.e., subscription or opt-in). Not that the planned action is not simply scheduled to take place on a particular day at an appointed hour—rather in accordance with the principles of the present invention if a wireless device configured or otherwise associated with given affinities also satisfies specific location parameters, then that wireless device receives action/influence from another wireless device, network server, third party, or other device in communication with that wireless device. The reception of influence can be represented as "profiled" or "deterministic" in the sense that it was the result of settings or parameters of a personal profile defined by the person prior to the time of the action. There is, of course, some analysis involved in the determination of either projective or receptive influence but the fundamental difference is the existence (or non-existence) of predefined parameters.

For the purposes of this invention, Attractive Inducement and Repulsive Inducement are defined from the standpoint of elements within the planes of affinity. Elements of Interaction that prefer to garner or concentrate a wireless device user's attention upon the element exert Attractive Inducement. Elements of Interaction that prefer to dissuade a wireless device user from concentrating on the element exert Repulsive Inducement.

Figure 3:
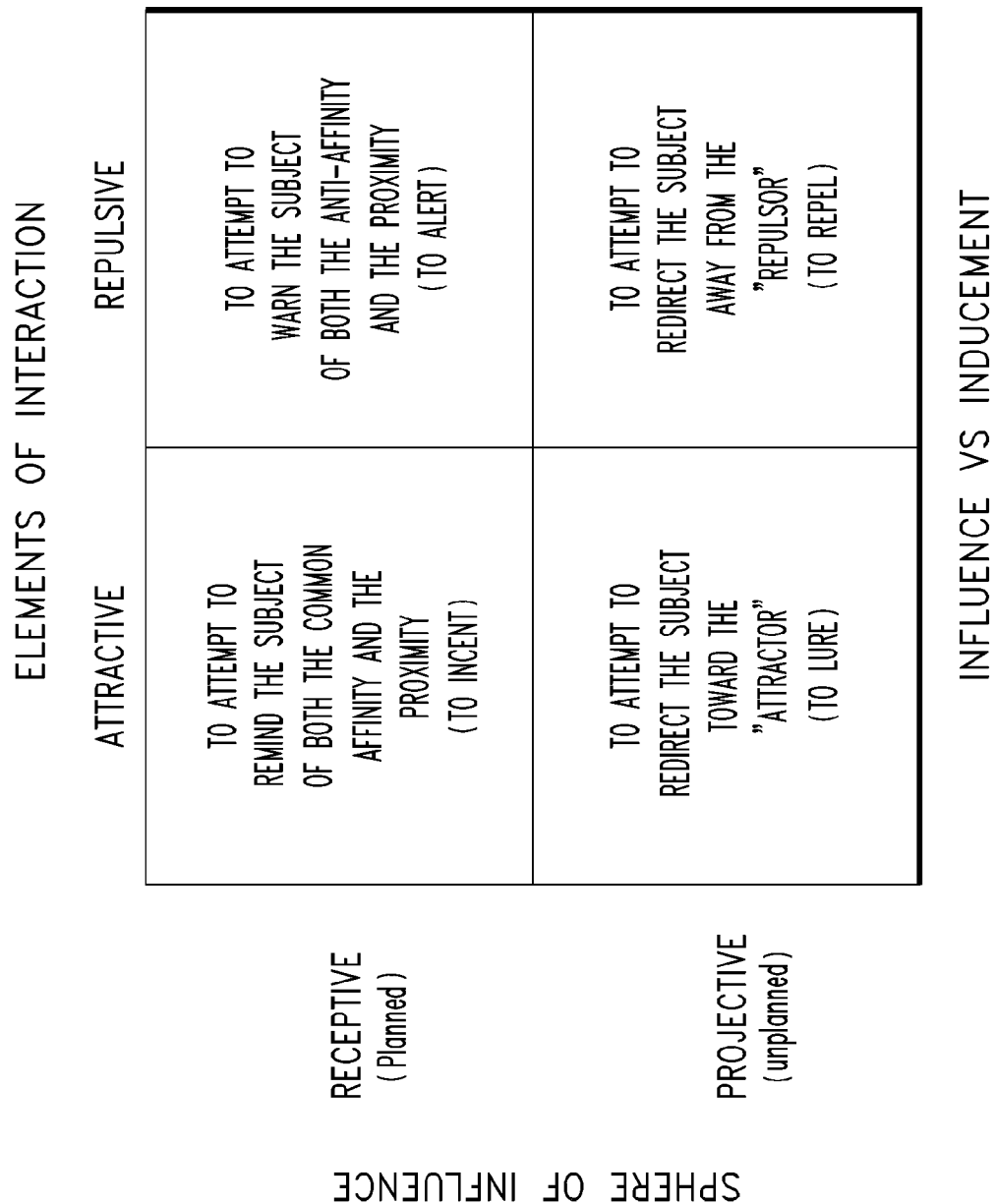
FIG. 3 elaborates the juxtaposition of attractive and repulsive inducement versus receptive and projective influence, and defines several permutations of influence between wireless devices, as represented by their sphere of influence, in accordance with the principles of the present invention.

FIG. 3 elaborates the juxtaposition of attractive and repulsive inducement versus receptive and projective influence, and defines several permutations of influence between wireless devices, as represented by their sphere of influence, in accordance with the principles of the present invention.

In particular, as shown in FIG. 3, the invention uses communication in various forms to represent the exertion of influence and inducement regardless of whether projected or received versus attractive or repulsive. This invention contemplates the use of any appropriate mode of communication to the wireless device user, in all its many forms, if that communication involves these human senses:

Audible—depending on the sense of hearing.
Visible—depending on sight.
Tactile—depending on the sense of touch.
Olfactory—depending on the sense of smell.

This invention uses communication to represent the exertion of influence/inducement but does not limit the concept to just communication. For instance, the projection of repulsive inducement from a secure US Military complex toward a wireless device user perceived to be an intruder may, conceivably, be physical.

Yet another embodiment of the invention uses proximity as the foundation for actualizing location based N-Dimensional Affinity Confluences. For the purposes of this embodiment the proximity evaluation is designed for speed of performance during proximity evaluation processing.

Figure 4:
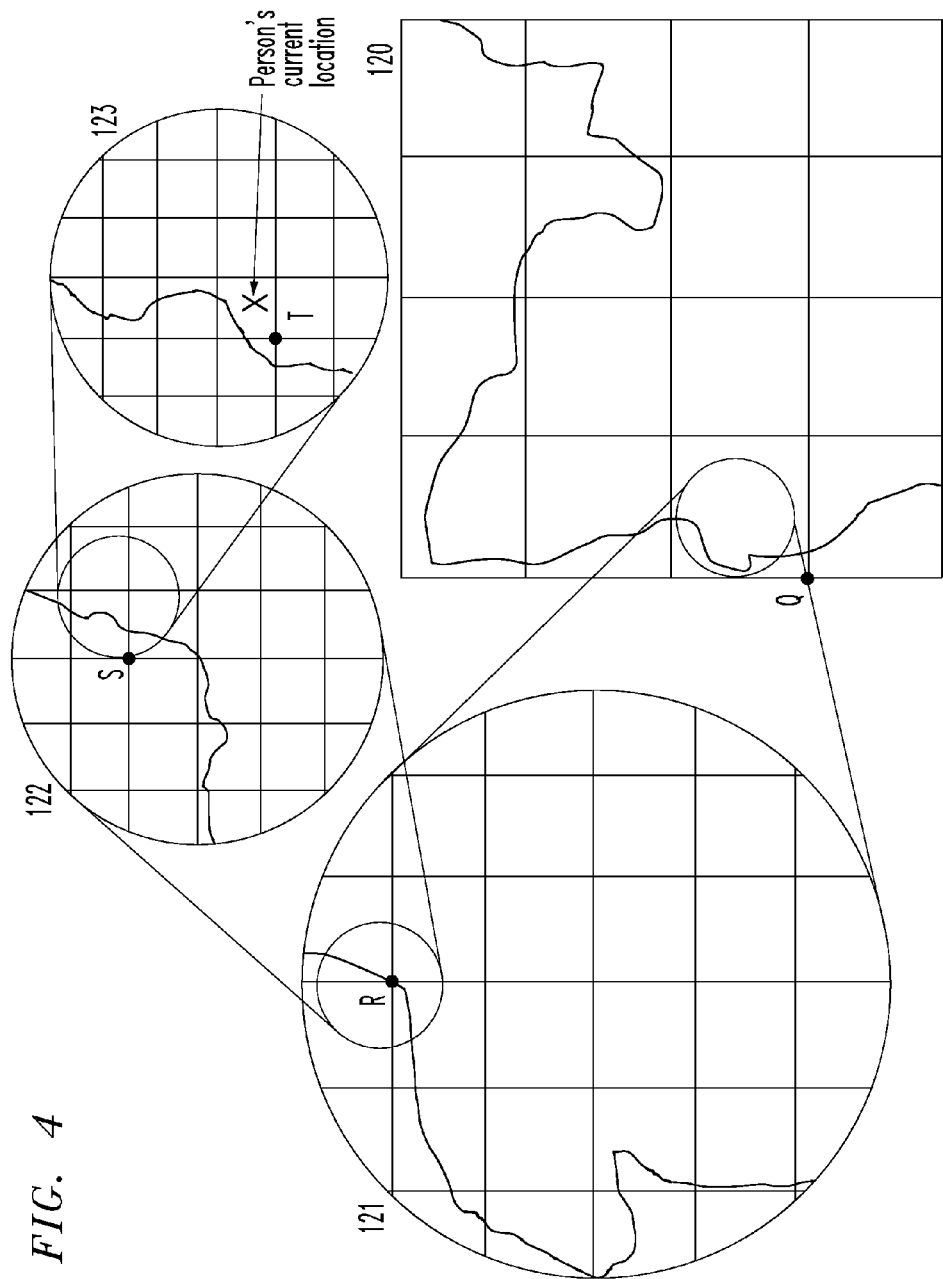
FIG. 4 depicts a wireless device user's location, in accordance with the principles of the present invention.

FIG. 4 depicts a wireless device user's location, in accordance with the principles of the present invention.

In particular, as shown in FIG. 4, the invention reduces a wireless device's location, represented, e.g., in decimal degrees of latitude and longitude, into indices of latitude and indices of longitude within four (4) layers: 1) Primary 120: tens of degrees (~700 statute mile resolution); 2) Secondary 121: degrees (~70 statute mile resolution); 3) Tertiary 122: minutes (~6000 foot resolution); and 4) Quaternary 123: seconds (~100 foot resolution). This figuratively covers the Earth's surface with successively finer grained gridlines. Seconds of latitude and longitude yield a grid whose vertices are approximately 100 feet apart at the equator and somewhat closer together the farther away from the equator (North or South) the person is located.

Should the need arise to attain even finer granularity than seconds, a fifth (Quinary) and even sixth (Senary) layer may be added to represent 10ths of seconds (~10 feet) and 100ths of seconds (~12 inches).

Every time a person's location is registered the GeoTrove will save that person's identifier, location (latitude and longitude), and optimization indices in a LOC table.

FIG. 5 shows an exemplary location (LOC) table, in accordance with the principles of the present invention.

In particular, as shown in FIG. 5, the Lat and Lon values are normalized to be decimal degrees in the range −90.0 through +90.0 for Latitude and −180.0 through +180.0 for Longitude. The indices are computed thusly:

$$PrimaryX = int(round((Lon/10.0)-0.5))$$

$$PrimaryY = int(round((Lat/10.0)-0.5))$$

$$PrimaryZ = \text{Altitude modulo 700 statute miles}$$

$$SecondaryX = int(truncate(Lon-(PrimaryX*10.0)))$$

$$SecondaryY = int(truncate(Lat-(PrimaryY*10.0)))$$

$$SecondaryZ = \text{Altitude modulo 70 statute miles}$$

$$TertiaryX = int(truncate((Lon-((PrimaryX*10.0)+SecondaryX))*60.0))$$

$$TertiaryY = int(truncate((Lat-((PrimaryY*10.0)+SecondaryY))*60.0))$$

$$TertiaryZ = \text{Altitude modulo 6000 feet}$$

$$QuaternaryX = int(truncate((Lon-((PrimaryX*10.0)+SecondaryX+(TertiaryX/60.0)))*3600.0))$$

$$QuaternaryY = int(truncate((Lat-((PrimaryY*10.0)+SecondaryY+(TertiaryY/60.0)))*3600.0))$$

$$QuaternaryZ = \text{Altitude modulo 100 feet}$$

Note that these equations presume that the round( ) function always rounds an "n.5" value up so that 0.5 becomes 1.0, 2.5 becomes 3.0, −3.5 becomes −3.0, etc. Some adjustments may be necessary to accommodate specific hardware architectures, operating systems, and compilers, as will be appreciated by those of skill in the art.

The intent, though, is to compute an index based on the lower left corner of the square in which the wireless device is located. The Primary square (See 'Q' in FIG. 4) is a 10 degree by 10 degree square. The Secondary square (See 'R' in FIG. 4) is a one degree by one degree square located within the Primary. The Tertiary square (See 'S' in FIG. 4) is a one minute by one minute square located within the Secondary. The Quaternary square (See 'T' in FIG. 4) is a one second by one second square located within the Tertiary.

These computations produce values in the following ranges:

$-18 <= PrimaryX <= 18 -9 <= PrimaryY <= 9 -1 <= PrimaryZ <= 36$

0<=SecondaryX<=9   0<=SecondaryY<=9-1<=SecondaryZ<=357
0<=TertiaryX<=60 0<=TertiaryY<=60-1<=TertiaryZ<=22,000
0<=QuaternaryX<=60   0<=QuaternaryY<=60-3<=QuaternaryZ<=1.32e06

Figure 6:
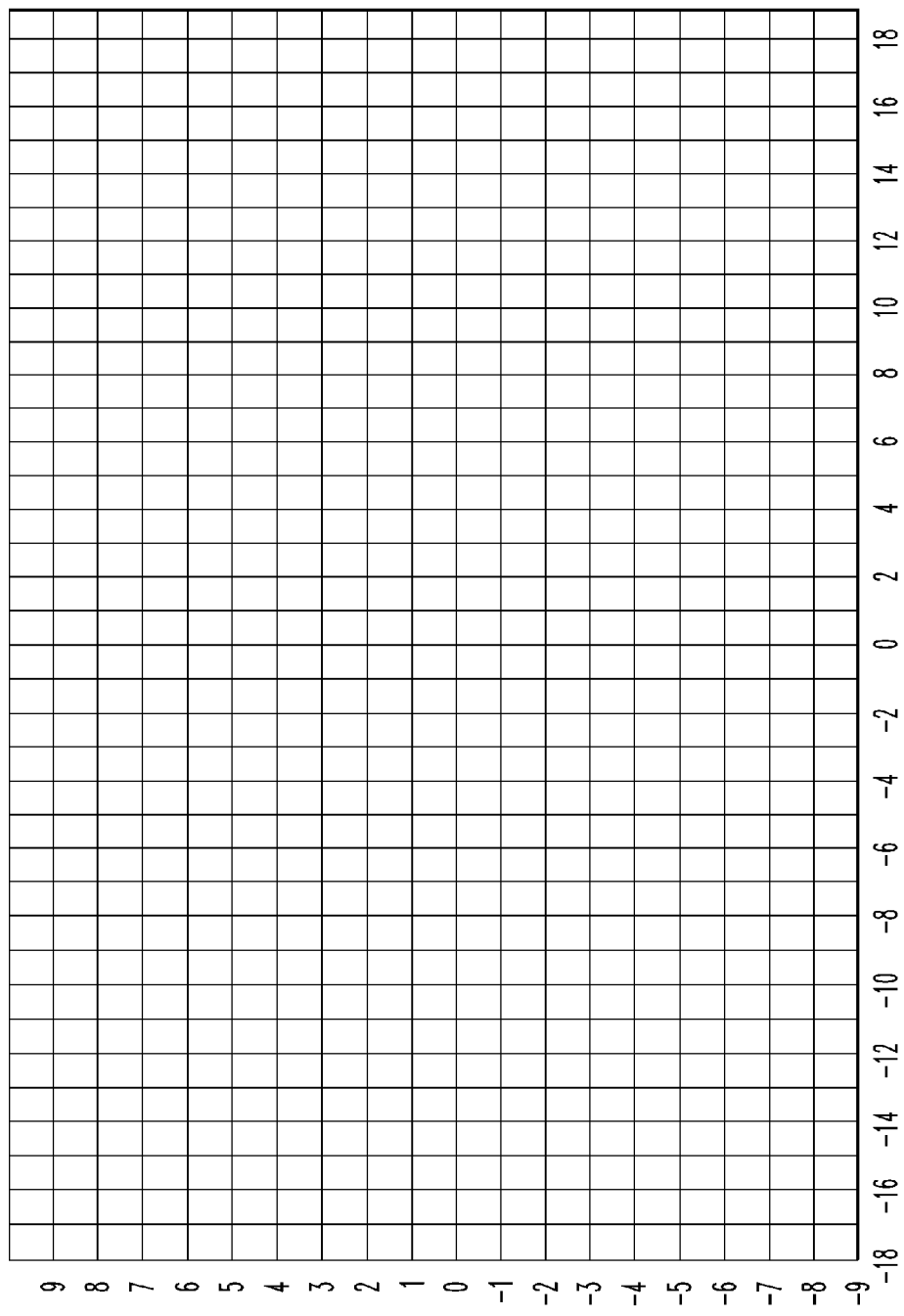
FIG. 6 shows an exemplary primary matrix, in accordance with the principles of the present invention.

FIG. 6 shows an exemplary primary matrix, in accordance with the principles of the present invention.

In particular, as shown in the primary matrix of FIG. 6, the GeoTrove maintains a collection of matrices. This collection of matrices always includes a matrix for the Primary indices (i.e. a "Primary Matrix").

The primary matrix is accompanied by a PrimaryCount indicating how many wireless devices or SPIN are present.

The Primary Matrix is also accompanied by an array or list of the primary matrix elements in which wireless devices/SPIN can be found. (The list is empty if PrimaryCount is zero.)

Each element in the 36×18 Primary matrix contains: (1) a count of how many wireless devices/SPIN are present in that particular 10 deg×10 deg area; and (2) a reference to a Secondary Matrix. (The reference is NULL if count is zero).

Secondary (10×10 matrix), Tertiary (60×60), and Quaternary (60×60) matrices are allocated, maintained, and eliminated as needed to manage GeoTrove memory use.

Each Secondary Matrix is accompanied by a SecondaryCount indicating how many wireless devices/SPIN are present in that 10 deg×10 deg area.

Each Secondary Matrix is also accompanied by an array or list of the secondary matrix elements in which wireless devices/SPIN can be found. (The list is empty if its SecondaryCount is zero.)

Each element in a 10×10 Secondary matrix contains: (1) a count of how many wireless devices/SPIN are present in that particular 1 deg×1 deg area; and (2) a reference to a Tertiary Matrix. (The reference will be NULL if the count is zero.)

Each Tertiary Matrix is accompanied by a TertiaryCount indicating how many wireless devices/SPIN are present in that 1 deg×1 deg area.

Each Tertiary Matrix is also accompanied by an array or list of the tertiary matrix elements in which wireless devices/SPIN can be found. (The list is empty if its TertiaryCount is zero.)

Each element in a 60×60 Tertiary matrix contains: (1) a count of how many wireless devices/SPIN are present in that particular 1 minute×1 minute area; and (2) a reference to a Quaternary Matrix. (The reference is NULL if count is zero.)

Each Quaternary Matrix is accompanied by a QuaternaryCount indicating how many wireless devices/SPIN are present in that 1 min×1 min area.

Each Quaternary Matrix is also accompanied by an array or list of the quaternary elements in which wireless devices/SPIN can be found. (The list is empty if QuaternaryCount is zero.)

Each element in a 60×60 Quaternary matrix contains: (1) a count of how many wireless devices/SPIN are present in that particular 1 second×1 second area; and (2) an array or list of wireless device/SPIN Identifiers that are present in the 1 sec×1 sec area. (The list is empty if count is zero.)

The evaluation of 'Z' axis differences are preferably not managed in a matrix structure but rather are evaluated in near real-time as a simple difference of like Z values (i.e. primary, secondary, tertiary, etc.). If the absolute value of the computed Z-difference (i.e. delta Z) is within the defined vertical bounds of proximity, then proximity has been successfully established. The same kind of approaching or retreating event (described in more detail later in this disclosure) results if the delta Z grew or shrank because a wireless device user was, e.g., riding an elevator, or climbing stairs within a building, even if the lateral X and Y components stayed well within the bounds of a predefined or configured proximity.

This four (4) tier data structure makes it possible for the GeoTrove to rapidly identify all of the wireless devices/SPIN in a predefined or preconfigured close proximity to an Affinity Confluence so that Influence and Inducement are resolved in a timely manner.

Proximity may be a configured reference value, e.g., defined in terms of hundreds of feet, thousands of feet, tens of miles, or hundreds of miles. The GeoTrove is able to rapidly identify which wireless devices/SPIN meet the criteria. The broader the defined proximity value, the longer it takes the GeoTrove to send all the notifications due to latencies imposed by the communication media.

The "Time Tag" element of each row in the LOC table (e.g., as shown in FIG. 5) is specifically intended to allow the quantification and actualization of time as one of the many affinity planes (or planes of interaction) that transect all SPheres of INfluence (SPINs). The confluence of time and location plus many other potential affinity planes of interaction give each wireless device the ability to quantify when it authorizes to either project or receive influence, or when it authorizes to be subject either to attractive or repulsive inducement. In this way particular affinity confluences may be scheduled in the N-dimensional affinity confluencer 100 for particular hours during the day or particular days of the week.

Similarly, an affinity confluence of location and business interests or a confluence of location and interests in art (or politics or music or whatever) that is typically not temporally constrained could be scheduled NOT to exert influence or react to inducement during a specific timeframe (e.g. for instance during a vacation of a particular wireless device user).

Proximity lends itself quite well to providing life enhancing service to wireless device users without unduly compromising privacy of information thereon because proximity notifications reveal neither the location of the wireless device receiving the notification, nor the person operating the wireless device to whom the notification refers. The GeoTrove certainly maintains as precise a location for every participating wireless device/SPIN as it is able to acquire, but the GeoTrove is intended to run inside a secure environment and reveal as little about the actual location(s) of the participants as is practical for any particular application or service. This simple fact makes proximity an excellent mechanism with which to actualize location based N-Dimensional Affinity Confluences in the N-dimensional affinity confluencer 100.

Primary facets of that actualization are proximity events. There are, e.g., two (2) principal proximity events about which some type of notification would be sent: (1) An Approaching event (i.e., a distance between evaluees is reducing); or (2) A Retreating event (i.e., a distance between evaluees is increasing).

Proximity events can be parameterized to even multiples of the base unit of measure for each of the four (4) to six (6) levels of accuracy/fidelity that the GeoTrove uses to track location data. If, for example, the GeoTrove provides four (4) levels of fidelity, then proximity events may be keyed to, e.g., even multiples of ~700 statute miles, even multiples of ~70 statute miles, even multiples of ~6000 feet, and even multiples of ~100 feet. Some of these overlapping fidelities clearly match, in the detail.

In yet another embodiment of the invention, the GeoTrove uses the lowest level of fidelity (i.e., the most coarse granularity) of matrix with which to satisfy any proximity event detection. So, for example, if a proximity event were parameterized as 12,000 feet, then the GeoTrove uses an even multiple of '2' against the Tertiary Matrix rather than an even multiple of 120 against the Quaternary Matrix. This is performed as an optimization for proximity event evaluations.

An alternate form of such an evaluation parameterizes the numeric value at which the fidelity of proximity events gets "rounded up" to provide nearly the same level of fidelity as was requested by the wireless device while providing the maximum performance possible (i.e. minimum evaluation time duration).

The GeoTrove includes configurable and parameterized hysteresis so that if the wireless device stimulating the proximity event, e.g., takes a track that skirts the edge of the proximity boundary, then the wireless device to which the event notification(s) is sent doesn't get barraged with the digital equivalent of "proximity SPAM". As such a wireless device stimulating a proximity event needs to approach (or retreat) a certain distance past the notification threshold before it would be possible to generate the opposite form of proximity notification.

In accordance with another embodiment of the present invention, the method or mechanism constantly re-computes, within the bounds of any particular element within the proximity matrix, an indication of that node's current "Affinity-Vector". The Affinity-Vector is simply a reference from each proximity matrix element to the single Affinity entry (See FIG. 2) that is represented within that proximity matrix element in the greatest numbers. If, for example, there were 40 wireless devices in a particular Quaternary node (i.e. ~100 ft resolution) and 25 of them are associated with an "Alaska Sport Fishing" affinity plane, where no other affinity to which those 40 wireless devices are associated totaled more than 7 or 8 wireless devices, then the Affinity-Vector for that quaternary node is a link to the "Alaska Sport Fishing" affinity plane. A key point, with regard to a node's affinity-vector, is that the affinity-vector is computed specifically for the purposes of manifesting attractive or repulsive inducement.

Figure 7:
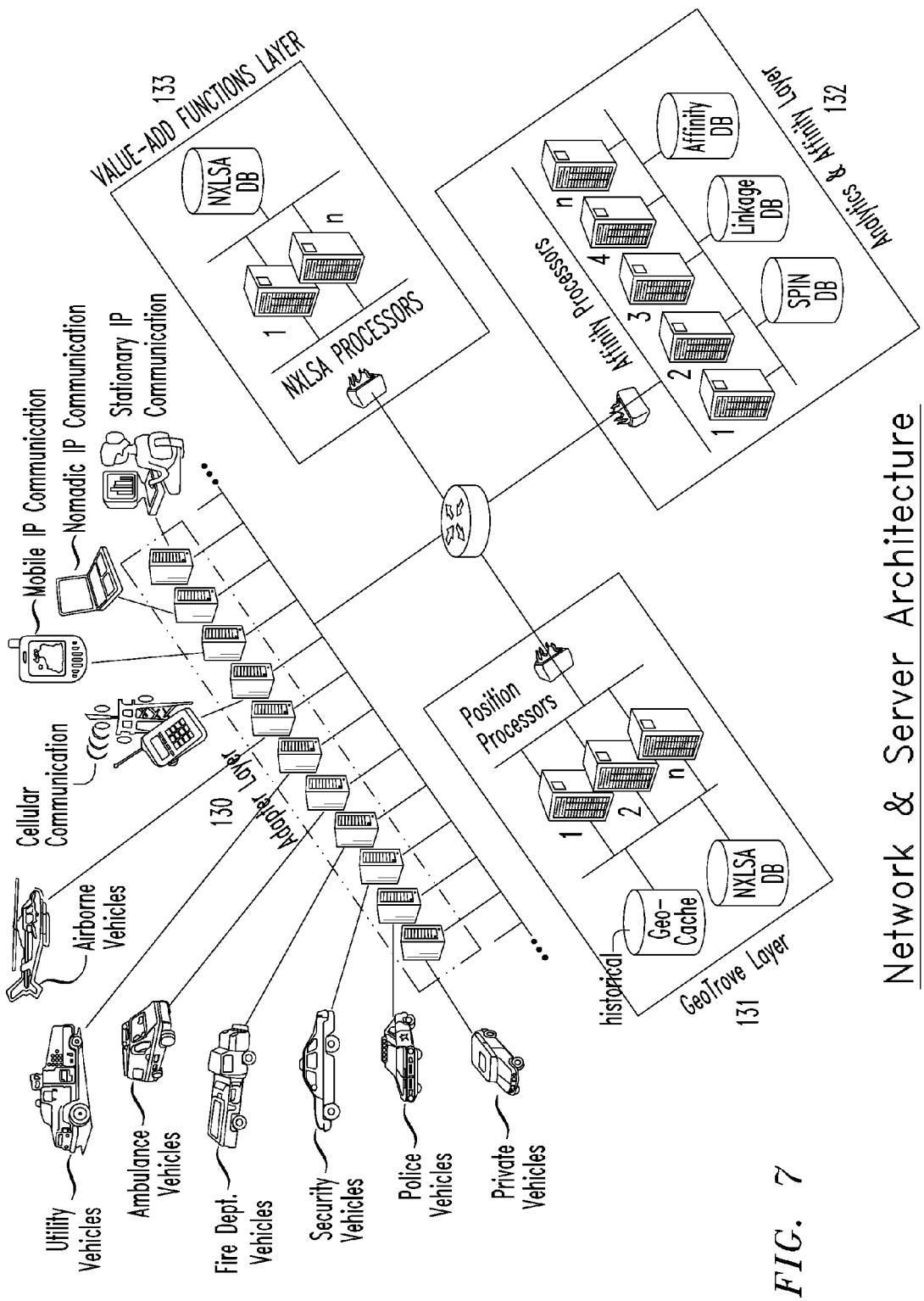
FIG. 7 shows an exemplary network and server architecture, in accordance with the principles of the present invention.

FIG. 7 shows an exemplary network and server architecture, in accordance with the principles of the present invention.

In particular, as shown in the network and server architecture of FIG. 7, the different facets of the current invention (i.e. the Adapter Layer 130, the GeoTrove Layer 131, the Analytics & Affinity Layer 132, and a Value-Add Function Layer 133) are depicted such that the current invention demonstrates how each is related to and connected with the others. The Adapter layer 130 manages the multitude of interfaces with external entities (constituted both by SPINs and by elements of interaction) so as to exchange both location and pertinent other information with a subset of the N-Dimensional Confluencer layers. The GeoTrove layer 131 maintains the structures described in FIGS. 4, 5, and 6. The GeoTrove layer 131 exchanges pertinent information and some location events with the Analytics & Affinity Layer 132 and the Value-Add Function Layer 133. The Analytics & Affinity layer 132 maintains the structures described in FIGS. 2 and 3. The Analytics & Affinity Layer 132 exchanges pertinent information and affinity events with the GeoTrove Layer 130 and the Value-Add Function Layer 133. The Value-Add Function Layer 133 maintains structures whose purpose is to combine and translate location events and affinity events into services (i.e. information and actions) valuable to both SPINs and elements of interaction.

To demonstrate the specific mechanics of this invention, one use case—a single embodiment of the present invention—will herein be described in detail:

The owner of charter fishing boat named "Orca" operating out of Ketchikan, Ak., uses his desktop computer (stationary IP communication) to subscribe to a "Charter Assist" service provided by the Network Xypoint Location Service Agent (NXLSA), a part of the Value-Add Functions Layer 133. The subscription charges a small monthly recurring fee to a credit card designated by the Orca's owner. The web pages hosted by the NXLSA are exposed to the public via proxy within the Adapter Layer 130.

The nature of NXLSA "Charter Assist" service is to help charter owners find persons in their vicinity interested in participating in the type of charter trips they offer. In this case, during the subscription process, the Orca's owner selects "Fishing" as the primary charter service and then adds "salmon" and "halibut" as secondary affinity qualifiers. These are specific embodiments of two aspects of the current invention but the invention isn't limited to just those examples of service type and sub-type.

NXLSA's service also allows the owner to interactively adjust charter fees in near-realtime via smartphone (mobile IP communication) or cellular phone (cellular communication) to help the owner attempt to charter a full complement of fisherman for every trip. These are specific embodiments of two aspects of the current invention but the invention isn't limited to just these two (2) examples of technology.

In addition, the NXSLA service allows the Orca's owner to designate a number of potential location sources or technologies with which to track the Orca's current location. The Orca's owner knows that he'll always be captaining Orca during the charter fishing trips and so during the subscription process he indicates that the Orca's location can be attained via "Cellular Phone" and proceeds to list the make & model of his cell phone, the carrier with whom he has subscribed for cellular service, and his cellular phone number. The Orca's owner also indicates that his cell phone is GPS capable (i.e. contains a GPS receiver with which the cell phone can locate itself) and that he prefers NXLSA to get his location via the GPS capability of his cell phone. The Orca's owner is prompted, during the subscription process, to download a handset application compatible with his cell phone. After successfully installing the handset application, the handset application auto-starts and asks the Orca's owner if he'd like to enable his cell phone's GPS capability. The handset application also asks the Orca's owner to designate the frequency at which the location of his cell phone will be reported. The Orca's owner selects "yes" and "every 60 minutes". Consequently, the handset application enables the GPS receiver, reports the cell phone's current location, and then goes into background operation mode waiting for 60 minutes to expire. At that time the Orca's owner's cell phone begins to report its location every hour. This is a specific embodiment of one aspect of the current invention but the invention is not limited to just this one example of location technology and methodology.

The NXLSA's "Charter Assist" service registers the Orca's owner with the Analytics & Affinity Layer 132 for affinities associated with CHARTER && FISHING && [SALMON||HALIBUT]. The Affinity Processors will search the Keyword-List Table (see FIG. 2114) for both CHARTER+FISHING+SALMON and CHARTER+FISHING+HALIBUT. If both can be found then the Affinity Processors proceed to SPIN registration for the Orca's owner. If either CHARTER+FISHING+SALMON or CHARTER+FISHING+HALIBUT cannot be found then either one or both combinations will be created in the Keyword-List Table 114 and saved in the Affinity Table 110 with a newly created Affinity ID. The Affinity Processors will look for the Orca's owner in the SPIN Table 112. If not found then a new SPIN Table entry will be created for the Orca's owner, two new entries in the Affinity-List Table 118 will be created—one for CHARTER+FISHING+SALMON and another for CHARTER+FISHING+HALIBUT—the two new entries in the Affinity-List Table will be linked to the Orca's owner's new SPIN record and then linked to one another. Both new entries in the Affinity-List Table will also be linked to the appropriate records in the Affinity Table 110. Lastly two (2) new entries will be added to the SPIN-List Table 116. The first will be linked to the CHARTER+FISHING+SALMON affinity record and the second will be linked to the CHARTER+FISHING+HALIBUT affinity record. Each of the two (2) new SPIN-List records will also be linked to the Orca's owner's SPIN record. Of course if the Orca's owner's SPIN record is found then the Affinity-List Table 118 will be searched for references to both the CHARTER+FISHING+SALMON affinity and the CHARTER+FISHING+HALIBUT affinity; said Affinity-List Table records will be created, if necessary, and properly linked to the related records in the Affinity Table 110 as well as causing updates to related records in the SPIN-List Table 116. If all Affinity Table 110, Keyword-List Table 114, SPIN Table 112, Affinity-List Table 118, and SPIN-List Table 116, are found and properly linked then no modifications will be made to any table. There are many possible permutations of the management of the five (5) tables described in FIG. 2. Said permutations are obvious to those skilled in the art of linked list management.

Every location report sent by the Orca's owner's cell phone is routed by the Adapter Layer 130 to the Position Processors within the GeoTrove Layer 131. The Position Processors first mark the LOC Table (see FIG. 5) record associated with the Orca's owner by negating the SPIN ID value. This marks the Orca's owner's LOC Table record as "update in progress". If the position is reported as a latitude/longitude pair, as is the case with the Orca's owner, then the Position Process proceed directly to computing the Hash Index from the Lat/Lon pair. If the position is reported as a civic address or some other common form of location report then the Position Processors geocode the input or perform some type of translation between mapping projections in order to achieve a high accuracy Latitude/Longitude pair. The Lat/Lon pair is used to compute a multi-byte HASH index representing the specific region within the Primary 120, Secondary 121, Tertiary 122, and Quaternary 123 matrices in which the Orca's owner's cell phone is located. If Quinary and Senary tiers are also being maintained then the HASH index is extended to accommodate the additional tiers of fidelity. The HASH index is first used to determine which specific Position Processor is maintaining the data structures for the PRIMARY geographic area associated with the Lat/Lon pair. Position Processors may be hierarchically related such that ocean areas and land areas that are sparsely populated are controlled by a small set of Position Processors (potentially just a single Position Processor) whereas land areas with very large populations and significant adoption of mobile technology (e.g. Los Angeles County, Calif.) are controlled by a multitude of Position Processors. The Hierarchical relationship of the Position Processors is such that a small collection of Position Processors attain the Lat/Lon pair, compute the HASH index, look up the resource indicator for the associated Primary 120 fidelity Position Processor, and then hand off to that Position Processor. The Position Processor associated with the Primary 120 fidelity updates the PRIMARY data structures (described previously in this disclosure) and then uses the HASH index to determine which Position Processor is handling the Secondary fidelity 121 for that geographic area. The same Position Processing that is maintaining the PRIMARY data structures for the computed geographic area may be maintaining the SECONDARY data structures too. If that is the case then all higher fidelity structures (i.e. Tertiary, Quaternary, Quinary, and Senary) will also be handled by that same Position Processor and no additional handoffs will be necessary. Addition of Position Processors to maintain a given geographic area occurs first in the highest fidelity tiers (Senary for a six tier system and Quaternary for a four tier system) and only affects lower fidelity tiers (e.g. Tertiary or Secondary) when population densities and mobile technology use grows to the point where additional processing power is needed to achieve acceptable performance. Each succeeding geographic tier processes the HASH index and updates the data structures associated with that tier and then hands off to the Position Processor maintaining the next higher fidelity tier. The SPIN's record within the LOC Table isn't updated until after the highest fidelity tier has been updated. There are two (2) critical things to remember about maintaining the multi-tiered geographic location system that is one embodiment of this invention: the GeoTrove. First, that the Position Processors must put the SPIN being updated into the appropriate tier segments associated with the new location. Second, that the Position Processors must take the SPIN being updated OUT of the tier segments associated with the SPIN's previous location. The tier references saved in the SPIN's record within the LOC table isn't updated with new tier references until all tiers have been updated so that the SPINs old location can be easily and quickly erased from every tier. Only then is the HASH index decomposed & saved as new tier references within the SPIN's LOC Table entry. Finally, the SPIN ID is once again negated (thus making it a positive value once more) to remove the indication of "update in progress".

Figure 8:
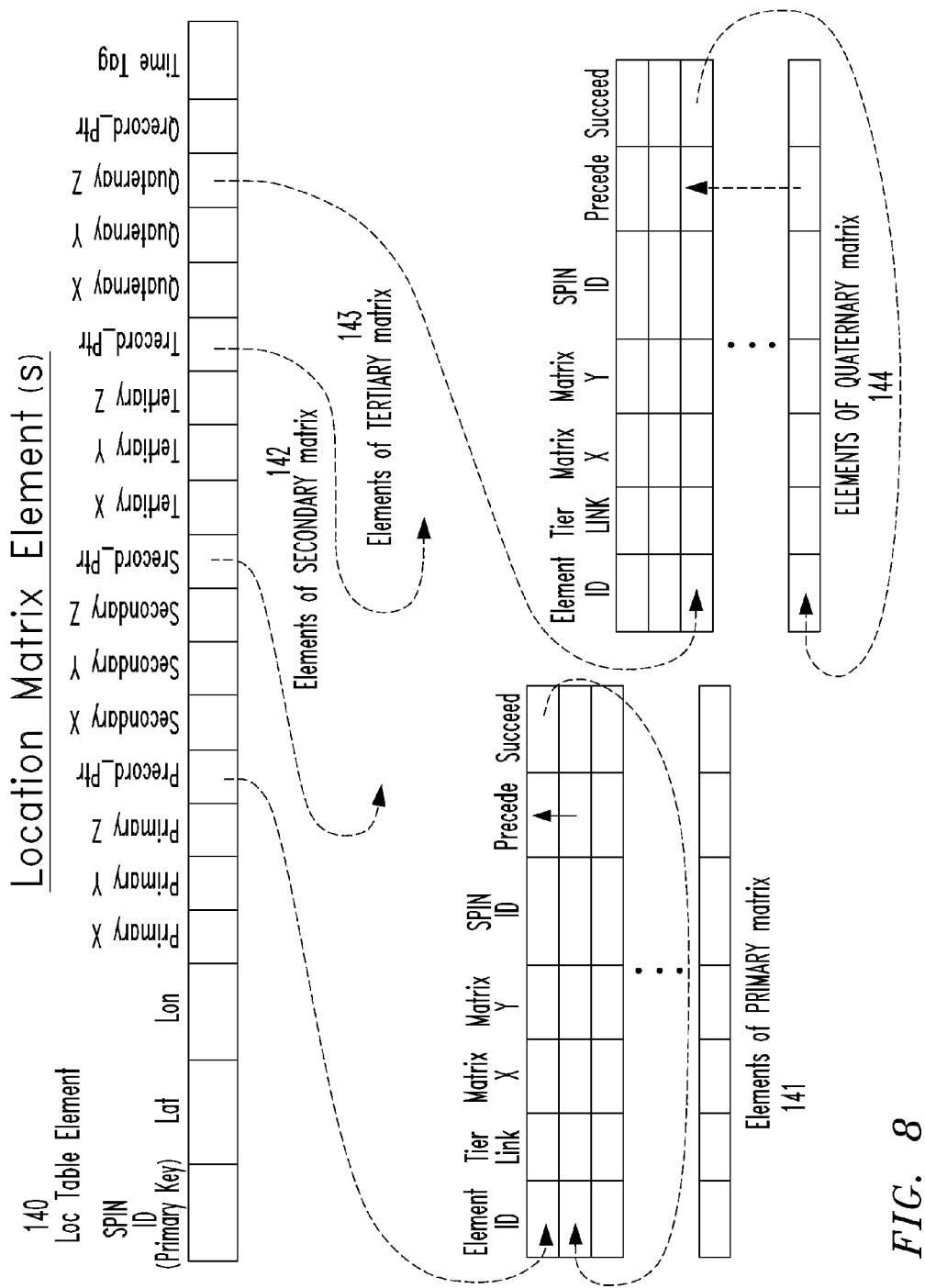
FIG. 8 shows an exemplary data structure used as elements within all tiers of the GeoTrove to assist with rapidly updating a SPIN's location.

In a related embodiment of this invention the management of the data within the GeoTrove Layer 131 for each and every tier of location fidelity (i.e. Primary, Secondary, Tertiary, Quaternary, etc.) is accomplished using doubly linked lists (see FIG. 8). Every record within the LOC table 140 (see FIG. 5) provides links into collections of element records used to keep track of SPINs within the PRIMARY tier 141, SECONDARY tier 142, TERTIARY tier 143, and QUATERNARY tier 144. The only time a SPIN's associated LOC record has NULL links to Primary, Secondary, Tertiary, and Quaternary matrix elements is if the location of that SPIN was once being monitored but is no longer being monitored. Subsets of element records may be associated with any one grid "node" within the associated matrix. Of course if there are no SPINs in that particular grid node then the count for the node is zero and the link from the grid master is NULL (as is described earlier in this disclosure). If there are one or more SPINs within this grid node then the grid master has a link into the ring of matrix elements; the specific matrix element to which the grid master links is irrelevant but is set when the first matrix element is added to the grid node and reset to a new element if the element to which the grid master has linked is deleted (i.e. moved to a different grid node). The LOC record associated with every SPIN points directly to the matrix element associated with that SPIN. To move a PRIMARY matrix element from one grid node (i.e. referred to in the following example as Grid Node "A") to a different PRIMARY matrix grid node (i.e. referred to in the following example as Grid Node "R"), the following actions are taken:

```
1)  NewGridPtr := GridNode[R].MatrixLink
2)  OldGridPtr := LOC_Table[SPIN ID].Precord_Ptr
    Note:   the syntax "LOC_Table[SPIN ID] was used here for
            convenience and is not meant to necessarily denote just a
            simple table index. A simple table index is certainly one
            embodiment of the present invention but the nomenclature is
            intended to represent any form of dereference of a single
            LOC_Table record from a collection of LOC_Table records
            using SPIN ID as the distinguishing criteria.
3)  If (OldGridPtr→succeed == LOC_Table[SPIN ID].Precord_Ptr)
    then
        // the matrix element was pointing to itself which means there was only one (1)
        // matrix element in Grid Node from which the element is being moved; that Grid
        // Node will now be empty
        GridNode[A].MatrixLink := NULL
    else
        // link the matrix element that formerly preceded & succeeded the matrix element
        // being moved to one another to take the matrix element being moved out of the
        // ring
        OldGridPtr→precede→succeed := LOC_Table[SPIN ID].Precord_Ptr→succeed
        OldGridPtr→succeed→precede := LOC_Table[SPIN ID].Precord_Ptr→precede
        // if the GridNode[A].MatrixLink was pointing to OldGridPtr,
        // then GridNode[A].MatrixLink needs to be re-established.
        if ( GridNode[A].MatrixLink == OldGridPtr )
        then
                GridNode[A].MatrixLink := OldGridPtr→succeed
        end if
    end if
4)  If (NewGridPtr == NULL)
    then
        // the new Grid Node is empty so force it to point to the new matrix element and
        // then link the element to itself
        GridNode[R].MatrixLink := LOC_Table[SPIN ID].Precord_Ptr
        LOC_Table[SPIN ID].Precord_Ptr→succeed := LOC_Table[SPIN ID].Precord_Ptr
        LOC_Table[SPIN ID].Precord_Ptr→precede := LOC_Table[SPIN ID].Precord_Ptr
    else
        // add the new matrix element to the ring that already exists for the new Grid Node
        LOC_Table[SPIN ID].Precord_Ptr→precede := NewGridPtr→precede
        LOC_Table[SPIN ID].Precord_Ptr→succeed := NewGridPtr
        NewGridPtr→precede→succeed := LOC_Table[SPIN ID].Precord_Ptr
        NewGridPtr→precede := LOC_Table[SPIN ID].Precord_Ptr
    end if
```

The act of moving the matrix element referred to by LOC_Table[SPIN ID].Precord_Ptr (or Srecord_Ptr, or Trecord_Ptr, etc.) does not actually change the content of Precord_Ptr but rather just changes the precede & succeed links contained within the matrix element structure such that the element is threaded into a ring within another Grid Node. The specifics of finding GridNodes "A" and "R" so as to dereference the forms listed above as "GridNode[A]" and "GridNode[R]" is considered obvious to one skilled in the art of data structure maintenance and list mechanics.

All of the Orca's owner's actions set the stage for a confluence of affinities but another spin is needed in order to create the juxtaposition needed for a confluence of location, desire (i.e. receptive and projective influence), and service (i.e. attractive or repulsive interaction).

Mr. Smith, of Memphis, Tenn., has long been a fan of fishing. Mr. Smith has recently become a member of a free social networking service—offered by the NXLSA—that allows him to use his home computer to register his interests in order to find and interact with other, like-minded folks in his vicinity. In order to allow the social networking service to provide timely notification of opportunities (i.e. confluences of affinity) Mr. Smith allows the service to locate his cell phone via non-GPS means twice a day between the hours of 7:30 am and 5:30 pm, local time. Mr. Smith generally fly fishes in fresh water rivers and streams near his home but Mr. Smith is planning an Alaskan cruise to Anchorage, Ak., that starts and ends in Seattle, Wash. Mr. Smith's fishing associates have told him that salmon fishing in Alaska is the best in the world so, in preparation for his trip Mr. Smith enhances his lists of interest to add "charter" and "salmon" as qualifiers to his declared interest in fishing. The cruise Mr. Smith has chartered advertises a service to help cruise ship passengers go on half day or full day fishing trips at some of the cruise's ports of call but the sum of the cruise ship's service fee and the charter fees advertised at various ports of call is nearly double what Mr. Smith is willing to pay to try fishing for salmon. Mr. Smith uses his home computer to further enhance his declared interest in fishing once again with "willing to travel <=10 miles" and "prefer reduced charter fee" as subordinate qualifiers to his interest in salmon fishing.

This creates the opportunity for an Affinity-Vector action trigger. The Analytics & Affinity Layer 132 builds Affinity-Vectors down through the various tiers in the GeoTrove 131 starting with the PRIMARY tier and honing the ActionIndex of each Affinity-Vector as each is refined in the better fidelity location tiers (e.g. Secondary, Tertiary, Quaternary, etc.). There are many Affinity-Vectors for every declared affinity. The Analytics & Affinity Layer 132 maintains an ActionThreshold value for every Position Processor in the GeoTrove 131 which allows ActionThresholds values to be kept very high for low fidelity location tiers like the PRIMARY and SECONDARY tiers but also allows much lower ActionThreshold values for location tiers where proximity is measured in smaller units of distance. ActionIndex values are computed in direct proportion to proximity; the closer SPINs with the same affinities are the greater the computed ActionIndex becomes. ActionIndex values rarely exceed the Action- Threshold for PRIMARY or SECONDARY tier Position Processors because the ActionThresholds are set high enough to prevent that for most areas. Exceptions occur in areas of low population density. The great majority of Actions initiated by the Analytics & Affinity Layer trigger as a result of ActionThreshold values maintained for the TERTIARY or QUATERNARY tier fidelity location tiers.

In the case of Mr. Smith, his cruise ship reached Ketchikan, Ak., at 5:00 pm AKDT. NXLSA had already detected that Mr. Smith was traveling West from Memphis, Tenn., so it temporarily increased the frequency of location determination so it could compute an appropriate delay for the "twice daily @ 7:30 am && 5:30 pm local time" location determinations stipulated by Mr. Smith. When Mr. Smith's NXLSA social networking service initiated a location determination at 5:30 pm AKDT and located him in Ketchikan the Analytics & Affinity Layer was able to refine a Charter+Fishing+Salmon AffinityVector to the TERTIARY location tier where, for Ketchikan, Ak., its AffinityIndex exceeded the 10 mile AffinityThreshold defined for that Position Processor. No action was initiated at that time, however, because of the subordinate "prefer reduced charter fee" qualifier. The next morning, when the Orca's owner received notification that one of the persons scheduled for that day's charter trip was unable to participate, Orca's owner used his cell phone to notify NXLSA that he was reducing the daily charter fee by 50% for one fisherman for that day only. This caused further refinement to the AffinityIndex value which triggered an early morning notification to both Mr. Smith and the Orca's owner asking both if they'd like to be connected. Both Mr. Smith and the Orca's owner replied "yes" so NXLSA created a conference bridge allowing Mr. Smith to arrange the details of his reduced-fee charter salmon fishing trip with the Orca's owner.

Other embodiments within the principles of the present invention are possible, including but not limited to the following types or examples of N-Dimensional Affinity Confluencers:

1) My Location+"people against speeding tickets"+cellular announcement of radar/laser detection ahead (see, e.g., Cellular Augmented Radar/Laser Detector U.S. Pat. No. 7,471,236).

2) Location of my vehicle+vehicle theft deterrence+activation of vehicle's alarm (see, e.g., Cellular Augmented Vehicle Alarm U.S. Pat. No. 7,825,780).

3) My Location+interest in locally broadcast, pseudo-anonymous, text communication (CB-SMS).

4) Location+advertised interest in social interaction+'N' element list of hobbies & interests (SMS-Roulette).

5) My Location+interest in Quisine|Theater|Sporting-Event|Retail-Offering|Childrens-Event|Street-Fair|Street-Performer+desire to participate.

6) My Location+interest in Quisine|Theater|Sporting-Event|Retail-Offering|Childrens-Event|Street-Fair|Street-Performer+desire to avoid.

7) My Location+cruise ship arrival schedule+desire to successfully secure parking.

8) My Location+Crime/Accident/Fire/HAZMAT incident+desire to avoid.

9) My Location+planned roadwork+desire to avoid.

10) My location+unplanned roadwork+desire to avoid.

11) Child's Location|Elder Parent's Location|Dependant's Location+miscellaneous event+desire to help them participate.

12) Child's Location|Elder Parent's Location|Dependant's Location+miscellaneous event+desire for them to avoid.

13) Location of preferred Band|Taco-Bus|Rave-Event|Team|Car-Club(s)+desire to participate.

14) My Location+anti-affinity+others' location+others' affinity+desire to avoid.

15) Strong affinities over an area+area advertisement.

16) Strong anti-affinities over an area+elimination of strongly unwanted area advertisements.

17) Lack of affinities over an area+area advertisement+desire to discover new things.

18) Political affinities over a region+candidates' desire to focus campaign spending.

19) My Location (or future location)+weather in an area+desire to be alerted.

20) My vehicles location+vehicle onboard computer measuring gas levels+gas stations location (ranked by price)+alert when gas level is low.

21) My vehicles location+vehicle onboard computer estimating miles left before out of gas+gas station location+alert you better get gas now.

22) My vehicles location+highway rest areas+time of continuous driving+alert rest area ahead (and how far) or better stop at this rest area.

23) My vehicles location+vehicle onboard computer measuring mileage since oil change+oil changing stations+alert when time to change oil.

While the invention has been described with reference to the exemplary embodiments thereof, those skilled in the art will be able to make various modifications to the described embodiments of the invention without departing from the true spirit and scope of the invention.

What is claimed is:

1. An N-dimensional affinity confluencer, comprising:
   an affinity table comprising a plurality of different affinities for each of a plurality of wireless devices;
   a sphere of influence (SPIN) table comprising a mapping of influence parameters corresponding to said plurality of different affinities; and
   an affinity confluence determination module to determine a sub-plurality of said plurality of wireless devices having an affinity confluence based on a selected plurality of said influence parameters maintained in said sphere of influence (SPIN) table.

2. The N-dimensional affinity confluencer according to claim 1, wherein:
   said affinities maintained in said affinity table include attractive associations between said plurality of wireless devices.

3. The N-dimensional affinity confluencer according to claim 1, wherein:
   said affinities maintained in said affinity table include repulsive associations between said plurality of wireless devices.

4. The N-dimensional affinity confluencer according to claim 1, wherein:
   said affinities maintained in said affinity table include attractive and repulsive associations between said plurality of wireless devices.

5. The N-dimensional affinity confluence according to claim 1, wherein:
   said selected plurality of influence parameters include location.

6. A method of determining an affinity confluence from among a plurality of wireless devices, comprising:
   building a database of at least two different affinities for each of a plurality of wireless devices;
   deriving a sphere of influence parameters corresponding to said different affinities determining a sub-plurality of said wireless devices having an affinity confluence based on a selected plurality of said influence parameters;

wherein said plurality of wireless devices need not be within a common electrical network.

7. The method of determining an affinity confluence from among a plurality of wireless devices according to claim 6, wherein:

said affinity confluence includes an attractive association between said plurality of wireless devices.

8. The method of determining an affinity confluence from among a plurality of wireless devices according to claim 6, wherein:

said affinity confluence includes a repulsive association between said plurality of wireless devices.

9. The method of determining an affinity confluence from among a plurality of wireless devices according to claim 6, wherein:

said affinity confluence both an attractive association and a repulsive association between said plurality of wireless devices.

10. The method of determining an affinity confluence from among a plurality of wireless devices according to claim 6, wherein said selected plurality of influence parameters include location.

* * * * *